United States Patent [19]

Sakai et al.

[11] Patent Number: 4,933,013

[45] Date of Patent: Jun. 12, 1990

[54] HYDRAULIC MATERIAL COMPOSITION HAVING HIGH STRENGTH

[75] Inventors: Etsuo Sakai, Ichikawa; Yukio Shibayama; Kazuhiro Kaizaki, both of Machida; Yasuhito Fushii, Tokyo, all of Japan

[73] Assignee: Denki Kagaku Kogyo Kabushiki Kaisha, Tokyo, Japan

[21] Appl. No.: 241,772

[22] Filed: Sep. 7, 1988

Related U.S. Application Data

[63] Continuation of Ser. No. 28,073, Mar. 19, 1987, abandoned, which is a continuation of Ser. No. 837,445, Mar. 7, 1986, abandoned.

[30] Foreign Application Priority Data

| Aug. 6, 1985 | [JP] | Japan | 60-171825 |
| Aug. 31, 1985 | [JP] | Japan | 60-192867 |
| Sep. 6, 1985 | [JP] | Japan | 60-195778 |
| Sep. 17, 1985 | [JP] | Japan | 60-203357 |

[51] Int. Cl.$^5$ ............... C04B 7/00; C04B 7/153; C04B 7/17

[52] U.S. Cl. ............... 106/85; 106/89; 106/97; 106/98; 106/117; 106/118; 106/DIG. 1

[58] Field of Search ............... 106/85, 89, 97, 98, 106/117, 118, DIG. 1

[56] References Cited

U.S. PATENT DOCUMENTS

| 3,558,335 | 1/1971 | Messenger | 106/97 |
| 4,111,711 | 9/1978 | Kiehl et al. | 106/98 |
| 4,472,201 | 9/1984 | Ochi et al. | 106/98 |
| 4,495,228 | 1/1985 | Cornwell | 106/89 |

FOREIGN PATENT DOCUMENTS 59-227762  12/1984  Japan ............... 106/97

*Primary Examiner*—Mark L. Bell
*Assistant Examiner*—Anthony J. Green
*Attorney, Agent, or Firm*—Jordan and Hamburg

[57] ABSTRACT

This invention is directed to a hydraulic material composition having high strength. The composition contains a hydraulic material, an ultra-fine particle, a water reducing agent and water. The hydraulic material contains 0 to 16.5% by weight of an aluminate phase consisting essentially of $3CaO.Al_2O_3$ and $4CaO.Al_2O_3.Fe_2O_3$.

14 Claims, No Drawings

HYDRAULIC MATERIAL COMPOSITION HAVING HIGH STRENGTH

This is a continuation of application Ser. No. 028,073, filed Mar. 19, 1987, which is a continuation of application Ser. No. 837,445, filed Mar. 7, 1986, both abandoned.

BACKGROUND OF THE INVENTION

1. Field of the Invention

The present invention relates generally to a hydraulic material composition having high strength, and more particularly to such a hydraulic material composition containing a hydraulic material, an ultra-fine particle, a water reducing agent and water.

2. Related Art Statement

It has been known from PCT Patent Application Laid-Open No. 55-500863 and PCT Patent Application Laid-Open No. 57-500645 that a cement composition having fluidity even at a low ratio of water to cement plus ultra-fine particle is obtainable by mixing a cement with an ultra-fine particle composed of silica fume which is a by-product of the process of producing ferrosilicon, and admixing with a water-reducing agent and water, followed by ordinary kneading operation; and that the compressive strength of the solidified mass of such a composition, after being aged in water, is not less than 100 MPa, with a further improvement in compressive strength by the combination of a special aggregate such that the compressive strength increases to 170 to 200 MPa.

However, the aforementioned known composition has a disadvantage that the hydrate contraction thereof is so large as to result in size change due to hydrate contraction or formation of cracking during the production process. On the other hand, it has been generally known that the strength of a solidified product is in close relation with the water/cement ratio so that a product having high strength can be obtained if the water/cement ratio is greatly reduced. The aforementioned known technique is one of the means for reducing the water/cement ratio. However, the fluidity of the composition having a low water/cement ratio significantly varies depending on the specific cement used. There is an ardent demand for the development of a cement composition having improved properties with high strength.

OBJECTS AND SUMMARY OF THE INVENTION

Accordingly, the principal object of this invention is to provide a hydraulic material composition which exhibits an improved fluidity even at a low water/hydraulic material ratio and gives a solidified product having high strength.

Another object of this invention is to provide a hydraulic material composition which is reduced in hydrate contraction, thus being prevented from cracking.

Additional object of this invention is to provide a hydraulic material composition which is improved in resistance to chemicals and gives a rigid and tough solidified product.

A further object of this invention is to provide a hydraulic material composition which exhibits high strength after a relatively short ageing time.

The above and other objects of this invention will become readily understood from the following detailed description of the invention.

According to the present invention, there is provided a hydraulic material composition having high strength comprising a hydraulic material, an ultra-fine particle, a water reducing agent and water, the hydraulic material containing 0 to 16.5% by weight of an aluminate phase consisting essentially of $3CaO.Al_2O_3$ and $4CaO.Al_2O_3.Fe_2O_3$.

DESCRIPTION OF THE INVENTION

The present invention will now be described more in detail.

The hydraulic material of the invention should contain an aluminate phase in the ratio of from 0 to 16.5 wt%, preferably from 0 to 14.0 wt%, based on the weight of the hydraulic material. The aluminate phase consists essentially of $3CaO.Al_2O_3$ and $4CaO.Al_2O_3.Fe_2O_3$. This means that the aluminate phase in the hydraulic material may be revealed by powder X-ray diffractiometry or optical microscopy and the like to confirm the presence of $3CaO.Al_2O_3$ and $4CaO.Al_2O_3.Fe_2O_3$; and that it has been defined, according to one important aspect of the invention, that the total content of $3CaO.Al_2O_3$ and $4CaO.Al_2O_3.Fe_2O_3$ should be in the range of from 0 to 16.5%, the content being calculated on the basis of the chemical composition determined by chemical analysis conducted generally in accordance with the JIS R-5202 Method while using the Bouge's equation. It should be noted here that the content of the aluminate phase is defined by percentage by weight (wt%) based on the weight of the hydraulic material. The fluidity of the composition at a low water/hydraulic material ratio is remarkably improved, as the content of aluminate phase decreases. If the content of aluminate phase exceeds 16.5 wt%, the fluidity of the composition at a low water/hydraulic material ratio is not appreciably improved.

The hydraulic materials which may be used in the present invention include various kinds of cements, mineral materials, combinations of materials having hydraulic activities and activators, and mixtures thereof. Examples of cements are various Portland cements, such as normal Portland cement, high early strength Portland cement, moderate heat Portland cement, white Portland cement and sulfate resisting Portland cement; various oil well cements; blended cements, such as silica cement, fly ash cement and blast furnace cement; and mixtures thereof.

Representative examples of the mineral materials which may be used as the hydraulic material in the composition of the invention are mineral materials of $Ca_3SiO_5$, solid solution of $Ca_3SiO_5$ and mixtures thereof. The mineral materials of $Ca_3SiO_5$ and/or solid solutions of $Ca_3SiO_5$ are principal constituents of Portland cements. Amongst them, mineral materials of $Ca_3SiO_5$ may be synthesized by repeating cyclic processing comprising the steps of mixing starting materials, such as lime and silica, to prepare a mixture containing CaO and $SiO_2$ in a molar raio of 3/1, burning the mixture at 1500° C. to 1600° C. and pulverizing the burnt mixture, until vanishing of free CaO is ascertained by powder X-ray diffractiometry or chemical analysis (Glycerine-alcohol method). On the other hand, the solid solutions of $Ca_3SiO_5$ are solid solutions normally containing about 90 to 95 wt% of $Ca_3SiO_5$ and the balance of one or more subsidiary constituents such as $Al_2O_3$, MgO and/or $Cr_2O_3$. One example of the solid solution of $Ca_3SiO_5$ is alite which is one of the main constituent minerals of general cements. Although somewhat different stoichiometric formulae have been proposed by individual research workers, the generally accepted formula thereof is $Ca_{105}Mg_2AlO_{36}(AlSi_{35}O_{144})$, as reported by G. Yamaguchi and S. Takagi, Proc. 5th Int'l Symp. Chem. Cement, Tokyo, 1, 181~225 (1968), with optional other trace constituents.

A variety of chemical formulae may be considered depending on the kinds and quantities of components contained in minerals of $Ca_3SiO_5$ and solid solutions of $Ca_3SiO_5$. The minerals of $Ca_3SiO_5$ and/or solid solutions of $Ca_3SiO_5$ used in the invention have the analytical values of X-ray diffractiometry generally agreeing with those of $Ca_3SiO_5$ and alite recorded in the JCPDS cards.

The solid solutions of $Ca_3SiO_5$ may be synthesized by mixing the starting materials including lime, silica and other materials containing constituent components, to prepare a mixture having a predetermined chemical composition, and subjecting the mixture to repeated burning at 1500° C. to 1600° C. followed by pulverization until free CaO disappears or vanishes. It is recommended to use converter slag as the starting material therefor, to lower the production cost. (In this connection, reference should be made to a report by Kubodera, Koyama, Ando and Kondo, at a symposium of Japan Steel Mfg. Association held at Tokyo University in April of 1977.) An exemplary process utilizing converter slag as the starting material will be described below.

LD converter slag, which is one example of molten converter slags, is reduced at a temperature of about 1800° C. to separate the slag from metals including Ti, Mn and V. The thus obtained reduced slag has a composition which varies slightly, and the composition may be adjusted by the addition of a small quantity of CaO or $SiO_2$. Adjustment of the composition may be effected by adding quick lime, quartz sand or silica fume as the sources for CaO and $SiO_2$ to the molten reduced slag, or by burning again in an electric furnace or the like at a temperature of about 1400° C. to 1500° C. The thus adjusted composition has an absorption peak, when analysed through the powder X-ray diffractiometry, agreeing with that of the alite recorded in the JCPDS card.

The materials having hydraulic activities include blast furnace slag, fly ash and mixtures thereof. Such a material generally has an average particle size of from 10 to 30 μm, and has no hydraulic property in itself but it is hardened to form a rigid mass when combined with an activator. Activators which may be combined with such materials having hydraulic activities to harden the same have been known in the art, and include a variety of cements; calcium hydroxide; calcium oxide; quick lime; calcium sulfoaluminate minerals; a variety of inorganic and organic alkaline salts, such as carbonates, bicarbonates, hydroxides, silicofluorides and sodium, lithium and potassium salts of gluconic acid and citric acid; and calcium sulfates, i.e. anhydride, hemihydrate and dihydrate of calcium sulfate. Any one of the aforementioned activators may be used singly or two or more of them may be used in combination. Any one or more of these activators may be added in an amount which varies depending on the required properties and the specific kind or combination of the activator used, and it is desirable that not more than 100 parts by weight, preferably not more than 60 parts by weight, of an activator be admixed with 100 parts by weight of the material having hydraulic activity. The particularly preferred material having hydraulic activity is blast furnace slag which is prepared by cooling the by-product slag discharged from a blast furnace of an iron manufacturing factory with water or air to obtain a vitreous material which is then pulverized.

When a substance which releases $Ca(OH)_2$ upon contact with water such as calcium hydroxide, calcium oxide, quick lime, or cements is used as an activator, it improves the fluidity of the entire composition significantly in cooperation with the action of the ultra-fine particle and the water reducing agent, with the result that the ultra-fine particles are dispersed uniformly in between the particles of the hydraulic material under the action of the water reducing agent to increase the strength of the final solidified mass remarkably. In order to attain the aimed for function of improving the fluidity of the composition by the addition of the substance releasing $Ca(OH)_2$ upon contact with water, it suffices to add such a very small quantity that to 100 parts by weight of the total amount of the hydraulic material and the ultra-fine particle there is added not more than 1 part by weight, preferably not more than 0.5 part by weight, of the $Ca(OH)_2$-releasing substance.

The combination of the aforementioned material having hydraulic activity and the activator is only slightly exothermic to reduce or prevent thermal cracking due to liberation of heat of hydration, and in addition has further advantages such that the contraction by hardening or drying of the composition is decreased, and that the composition containing such a material having hydraulic activity is improved in resistance to chemicals.

As described hereinbefore, the hydraulic material of the invention should contain 0 to 16.5 wt% of an aluminate phase. To satisfy this essential condition or feature, when the hydraulic material used in the composition is a material containing a large amount of aluminate phase, for example, normal Portland cement, high early strength Portland cement or moderate heat Portland cement, it should be combined with the mineral material or the material having hydraulic activity, both containing no aluminate phase, or a material having only a little aluminate phase, for example, white Portland cement, sulfate resisting Portland cement, oil well cements or blended cements so that the content of aluminate phase in the final composition is not more than 16.5 wt%.

To the composition of the invention may be added, in addition to the hydraulic material, an additive, such as an expansive additive, a rapid hardening agent, a mixing additive for exhibiting high strength, an accelerator and a retarder. Preferable expansive additives are ettringite type expansive additives, such as "CSA #20" (Trade Name) available from Denki Kagaku Kogyo K.K., and burnt quick limes, particularly burnt quick lime prepared by burning at a temperature of from 1100° to 1300° C. and having an average particle grain size of not more than 10 microns. On the other hand, examples of preferable rapid hardening agents are calcium aluminate type materials, such as alumina cements or combinations of alumina cements with calcium sulfate, the one sold under the Trade Name of "Denka ES" from Denki Kagaku Kogyo K.K., and the one sold under the Trade Name of "Jet Cement" from Onoda Cement Co., Ltd. Examples of effective mixing additives for exhibiting high strength are calcium sulfate type materials, such as the one sold under the Trade Name of "Denka Σ-1000"

from Denki Kagaku Kogyo K.K. and the one sold under the Trade Name of "Asano Super Mix" from Nippon Cement Co., Ltd.

Examples of accelerators are chlorides such as calcium chloride, thiocyanates, nitrites, chromates and nitrates. Examples of retarders are saccharides; soluble dextrin; organic acids and salts thereof such as gluconic acid; and inorganic salts such as fluorides.

In ageing the hydraulic material composition of the invention, it is preferred that the ageing operation include high temperature ageing effected at about 50° C. to 250° C. or include high temperature and high pressure ageing effected at about 50° C. to 250° C. in order to accelerate the hydration of hydraulic materials. It is also possible to compensate the contraction by the use of an expensive cement, to allow exhibition of required strength after a relatively short ageing time by the use of a rapid hardening cement, or to increase the strength of the hardened mass to a high level by the use of a calcium sulfate system mixing agent.

The ultra-fine particle used in the invention may preferably have an average particle size which is smaller by at least one order than the average particle size of the hydraulic material which ranges generally within 10 to 30 $\mu$m. More specifically, it is desirable that the average particle size of the ultra-fine particle be not more than 3 $\mu$m, preferably not more than 1 $\mu$m, and more preferably from about 0.1 to 1 $\mu$m. By the addition of the ultra-fine particle, exhibition of strength is enhanced and the fluidity of the composition is increased. Examples of preferable ultra-fine particles are silica dust or siliceous dust obtained as the by-products in the preparation of silicon, silicon-containing alloy or zirconia, and other materials which may be used in the invention include calcium carbonate, silica gel, opalic silica, fly ash, blast furnace slag, titanium oxide and aluminium oxide. Any of the mineral materials of $Ca_3SiO_5$ and solid solutions of $Ca_3SiO_5$ may be pulverized into an ultra-fine particle form which may also be used as the ultra-fine particle in the composition of the invention. Hydrate contraction of the composition can be effectively suppressed by the use of ultra-fine particles of opalic silica, fly ash and blast furnace slag prepared by pulverizing them by the combined use of a classification separator and a pulverizer.

A portion or all of the ultra-fine particle may be replaced by a pulverized activator which has been pulverized to have an ultra-fine particle size. Two or more different kinds of ultra-fine particles may be used in combination. For example, 100 parts by weight of ultra-fine opalic silica, fly ash or blast furnace slag is mixed with not more than 75 parts by weight of ultra-fine silica fume particle to be used as the ultra-fine particle component in the composition of the invention. A variety of pulverizers, such as ball mill and vibration mill, may be used for the preparation of fine particles, but the particularly preferred pulverizer is a supersonic jet mill wherein powder particles are continuously and automatically fed to and carried by a flow of supersonic flow velocity of higher than Mach 2.5 to be impinged onto an impinging plate. An ultra-fine particle having an average particle size smaller by one to two orders than the average particle size of the hydraulic material may be selectively collected by using a classification separator assembled with the supersonic jet mill. In order to improve the efficiency in preparation of ultra-fine particle, it is recommendable, as a preliminary treatment, to pulverize the material for the ultrafine particle by a ball mill or vibration mill to have an average particle size which is substantially in the same degree as that of the hydraulic material.

The ultra-fine particle is used preferably in an amount so that 60 to 95 parts by weight of hydraulic material is mixed with 5 to 40 parts by weight of ultra-fine particle, and more preferably in an amount so that 65 to 90 parts by weight of hydraulic material is mixed with 10 to 35 parts by weight of ultra-fine particle. If the amount of the ultra-fine particle is less than 5 parts by weight, the strength of the hardened composition may be lowered below the satisfactory level; whereas if the amount of the ultra-fine particle is more than 40 parts by weight, the fluidity of the kneaded composition may be lowered to a level to pose difficulty in molding operation and the strength of the hardened composition may be lowered to unsatisfactory level.

The water reducing agent used in the invention is a surface active agent which has a high dispersibility and which may be added to a hydraulic material in a large quantity without accompanying excessively early or retarded setting and without excess air entrainment. Examples of the water reducing agent which may be preferably used in the composition of the invention include those mainly composed of salts of condensation product of naphthalenesulfonic acid and formaldehyde, salts of condensation product of alkylnaphthalenesulfonic acid and formaldehyde, salts of condensation product of melaminesulfonic acid and formaldehyde, high molecular weight ligninsulfonates and polycarboxylates. In consideration of the effect in improving the fluidity and economy, it is preferred to use salts of condensation product of naphthalenesulfonic acid and formaldehyde or salts of condensation product of alkylnaphthalenesulfonic acid and formaldehyde. Preferably not more than 10 parts by weight, more preferably 1 to 5 parts by weight, of water reducing agent is added to 100 parts by weight of hydraulic material. The water reducing agent is added with the aim of preparing a composition having a low water/(hydraulic material+ultra-fine particle) ratio, and the addition thereof in excess of 10 parts by weight may adversely affect the hardening of the composition. In the present invention, a water reducing agent is combined with an ultra-fine particle so as to obtain a hydraulic material composition which has a fluidity high enough for molding by ordinary molding operation even when the water/(hydraulic material+ultra-fine particle) proportion is not more than 25%.

Although some amount of water is necessary for molding the composition, the water content should be as small as possible for obtaining a hardened mass having high strength, and it is preferred that 100 parts by weight of the mixture of hydraulic material with ultra-fine particle be added with 10 to 30 parts by weight, more preferably 12 to 25 parts by weight, of water. It may become hard to obtain a hardened mass having high strength if more than 30 parts by weight of water is added, whereas difficulties are encountered in molding the composition through ordinary processes, such as casting, if the added amount of water is less than 10 parts by weight. However, the water content is not always limited to the defined range, for example, a composition to which is added less than 10 parts by weight can be molded by the compression molding process. The composition of the invention may be molded through any process generally used for molding ordinary cement concrete compositions, including the extrusion molding process.

In general, to the composition of the invention is added a variety of aggregates. Any of the aggregates generally used for aggregate in the fields of civil engineering and buiding construction may be used in the composition of the invention, the usable aggregates being river sand, mountain sand, seashore sand, crushed sand, slag sand, crushed rock, river gravel, slag gravel and light-weight aggregates. It is preferred, with a merit of considerable improvement in strength, to use an aggregate selected to have a Moh's hardness of not less than 6, more preferably not more than 7, or in accordance with another standard, to have a Knoop indentor hardness of not less than 700 kg/mm$^2$, more preferably not less than 800 kg/mm$^2$. Examples of the aggregates satisfying the aforementioned requirements defined by either one of the standards are silica, emery, pyrite, ferrite, topaz, lawsonite, diamond, corundum, phenacite, spinel, beryl, chrysoberyl, tourmoline, granite, andalusite, staurolite, zircon, burnt bauxite, calcinated alum shale, boron carbide, tungsten carbide, ferrosilicon nitride, silicon nitride, fused silica, electrofused magnesia, silicon carbide, cubic boron nitride and crushed ceramics. Metallic materials, such as iron or stainless steel, may also be used when it is desired to subject the hardened mass to further machining operation.

An aggregate may generally be used in an amount such that not more than five times by weight of the aggregate is added to unit weight of the sum of the hydraulic material and the ultra-fine particle, when the composition is molded by normal casting process. The added amount of the aggregate would vary out of the aforementioned range when the composition of the invention is molded through the prepacked process wherein an aggregate has been preliminarily placed in situ and then the composition in the form of paste or mortar is cast or poured over the aggregate, or when the composition of the invention is molded by the postpacked process wherein the aggregate and the mortar are placed in the vice versa sequence.

Various fibers or nettings may be admixed as reinforcing material. Examples of fibers suited for this purpose are various natural and synthetic mineral fibers, such as steel fibers, stainless steel fibers, asbestos fibers and alumina fibers, carbon fibers, glass fibers, and natural and synthetic organic fibers, such as propylene, vinylone, acrylonitrile, polyamide synthetic fibers and cellulose fibers. It is also possible to use other reinforcing materials which have been conventionally used for such purpose, the examples being steel rods or FRP rods.

Materials affording other functions, for example for affording slidability, may be contained in the composition. For instance, a so-called solid lubricant, such as molybdenum disulfide, hexagonal boron nitride or carbon which may be impregnated with oil, may be added to the composition of the invention.

A material for affording special functions, such as thermal conductivity or electrical conductivity, may also be added. The process and sequence of addition in mixing and kneading the aforementioned additives are not critical as far as they can be mixed and kneaded to form a uniform admixture.

Ageing of the molded mass may be effected by any methods including ageing at room temperature, ageing with vapor at atmospheric pressure, ageing at high temperature and at high pressure and ageing at high temperature. These methods may be combined to obtain a hardened mass having high strength, as desired.

By the use of the hydraulic material composition having high strength, according to the invention, a table flow (measured by JIS R-5201) of not less than 250 mm can be provided at a water/(hydraulic material + ultra-fine particle) ratio of about 20% and at a (hydraulic material + ultra-fine particle)/aggregrate ratio of 1 to obtain a hardened mass having a compressive strength of not less than 1000 kgf/cm$^2$.

Since the hydraulic material composition of the invention forms a hardened mass having an extremely high strength with the addition of greatly reduced quantity of water, it may be applied for various uses as a composite industrial material, more specific examples being molds for press and injection moldings, milling grindstones, surface table, rollers in paper-making process.

EXAMPLES OF THE INVENTION

The present invention will now be described more specifically with reference to examples thereof. Meantime, "%" and "part" in the following Examples stand for "wt%" and "part by weight" unless otherwise specified.

EXAMPLE 1

A portion of a normal Portland cement (Content of Aluminate Phase: 17.8%) was substituted by white Portland cement (Content of Aluminate Phase: 12.5%) to obtain a series of mixtures, as set forth in the following Table 1. Each of the mixtures was kneaded in a mortar mixer and then the fluidity thereof was measured to learn the table flow value according to the JIS R 5201 Method. Kneading was effected for one minute at a low speed, followed by high speed kneading for two minutes, and then an additional kneading for one minute at low speed.

A 4×4×16 cm sample was molded from each of the mixtures, and the compressive strength of the hardened sample was measured generally in accordance with JIS R 5201 Method, after being aged at 20° C. and at 80% RH for one day and then aged at 50° C. in air saturated with water vapor for three days. The results are shown collectively in Table 1.

Materials Used:
Cement: Normal Portland cement (produced and sold by Sumitomo Cement Co. Ltd.) containing 17.8% of $C_3A + C_4AF$; and White Portland cement (produced and sold by Chichibu Cement Co. Ltd.) containing 12.5% of $C_3A + C_4AF$ Ultra-fine Particle: Silica fume (produced and sold by Japan Metals & Chemicals Co., Ltd.) having an average particle size of 0.1 μm.

Water Reducing Agent: A condensation product of β-naphthalenesulfonic acid and formalin, produced and sold by Dai-ichi Kogyo Seiyaku Co. Ltd. under the Trade Name of "Selflow 110P".

Aggregate: An aggregate having a particle size of not more than 1.2 mm and produced and sold by Sumitomo Metal Mining Co., Ltd. under the Trade Name of "Emery".

Water: City Water

---

Note: 1. $C_3A = 3CaO.Al_2O_3$
$C_4AF = 4CaO.Al_2O_3.Fe_2O_3$
The same abridged representations will be adopted -continued hereinafter.
2. The average particle size of the ultra-fine particles was measured by the transition electron microscopy.

are shown in Table 4. Ageing was effected at 20° C. and at 80% RH for one day, ageing in water maintained at 20° C. for 7 and 28 days, ageing at 50° C. in air saturated with water vapor for 7 days, and ageing in an autoclave at 180° C. for 3 hours.

Materials Used:

TABLE 1

| Run No. | Composition (parts by weight) | | | | | | Aluminate Phase (wt %) | Table Flow (mm) | Compressive Strength (kgf/cm$^2$) |
|---|---|---|---|---|---|---|---|---|---|
| | Normal Portland Cement | White Portland Cement | Ultra-fine Particle | Water Reducing Agent | Aggregate | Water | | | |
| 1 | 90 | — | 10 | 2 | 100 | 19 | 17.8 | 195 | 1350 |
| 2 | 80 | — | 20 | 2 | 100 | 19 | 17.8 | 203 | 1378 |
| 3 | 60 | 20 | 20 | 2 | 100 | 19 | 16.5 | 215 | 1380 |
| 4 | 40 | 40 | 20 | 2 | 100 | 19 | 15.2 | 237 | 1379 |
| 5 | 20 | 60 | 20 | 2 | 100 | 19 | 13.8 | 243 | 1412 |
| 6 | 4 | 76 | 20 | 2 | 100 | 19 | 12.8 | 250 | 1430 |
| 7 | 45 | 45 | 10 | 2 | 100 | 19 | 15.2 | 230 | 1370 |
| 8 | 4 | 76 | 10 | 2 | 100 | 19 | 12.8 | 247 | 1403 |

Run Nos. 1 and 2 are comparative examples and Run Nos. 3 to 8 are examples.

EXAMPLE 2

An alite (Content of $C_3A + C_4AF$: 0%) synthesized from an LD converter slag was further added in respective cement mixtures described in Example 1 to prepare mixtures which were tested similarly. The results are shown in Table 2.

Materials Used:
Alite: Synthesized from an LD converter slag having a content of $C_3A + C_4AF$ of 0%, and a specific surface area (Blaine value) of 3420 cm$^2$/g.

Activator: *White Portland cement available from Chichibu Cement Co., Ltd. (Aluminate Phase 12.5%) *Calcium sulfate dihydrate (Extra fine grade reagent) *An anhydrous calcium sulfate base additive available from Denki Kagaku Kogyo K.K. under the Trade Name of "Denka Σ1000".
Ultra-fine Particle: Silica fume (produced and sold by Japan Metals & Chemicals Co., Ltd.) having an average particle size of 0.1 μm.
Water Reducing Agent: A condensation product of β-naphthalenesulfonic acid and formalin, produced and sold by Dai-ichi Kogyo Seiyaku Co. Ltd. under the Trade Name of "Selflow 110P".
Silica Powder: Mixture of Nos. 3, 4 and 5 prepared by mixing equal amounts thereof.
Water: City Water.
Blast Furnace Slag: A powder of a granulated blast furnace slag having a Blaine value of 4200 cm$^2$/g and containing 0 wt% of aluminate phase.

TABLE 2

| Run No. | Composition (parts by weight) | | | | | | | Aluminate Phase (wt %) | Table Flow (mm) | Compressive Strength (kgf/cm$^2$) |
|---|---|---|---|---|---|---|---|---|---|---|
| | Normal Portland Cement | White Portland Cement | Alite | Ultra-fine Particle | Water Reducing Agent | Aggregate | Water | | | |
| 9 | 60 | — | 20 | 20 | 2 | 100 | 19 | 13.4 | 235 | 1417 |
| 10 | 40 | — | 40 | 20 | 2 | 100 | 19 | 8.9 | 260 | 1382 |
| 11 | 20 | — | 60 | 20 | 2 | 100 | 19 | 4.5 | 265 | 1403 |
| 12 | 4 | — | 76 | 20 | 2 | 100 | 19 | 0.6 | >300 | 1410 |
| 13 | 40 | 20 | 20 | 20 | 2 | 100 | 19 | 12.0 | 242 | 1395 |
| 14 | — | 80 | — | 20 | 2 | 100 | 19 | 12.5 | 250 | 1320 |
| 15 | — | 60 | 20 | 20 | 2 | 100 | 19 | 9.4 | 265 | 1405 |
| 16 | — | 40 | 40 | 20 | 2 | 100 | 19 | 6.3 | 280 | 1387 |
| 17 | — | 4 | 76 | 20 | 2 | 100 | 19 | 0.6 | >300 | 1410 |

EXAMPLE 3

The compositions set forth in Table 3 were kneaded and de-bubbled in an Omni-mixer (vacuum type) available from Chiyoda Technical and Industrial Co., Ltd., and 4×4×16 cm samples of respective compositions were prepared and the compressive strength of the hardened and aged samples were measured. The results

TABLE 3

| Run No. | Composition (parts by weight) | | | | | | | | Aluminate Phase (wt %) |
|---|---|---|---|---|---|---|---|---|---|
| | Blast Furnace Slag | Activator | | | Ultra-fine Particle | Water Reducing Agent | Siliceous Sand | Water | |
| | | Cement | Calcium Sulfate | Σ 1000 | | | | | |
| 18 | 50 | 50 | — | — | 20 | 24 | 120 | 24 | 6.3 |
| 19 | 42 | 50 | 8 | — | 20 | 24 | 120 | 24 | 6.3 |
| 20 | 71 | 29 | — | — | 20 | 24 | 120 | 24 | 3.6 |
| 21 | 61 | 30 | 9 | — | 20 | 24 | 120 | 24 | 3.8 |
| 22 | 61 | 30 | — | 9 | 20 | 24 | 120 | 24 | 3.8 |
| 23 | 71 | 29 | — | 10 | 10 | 24 | 120 | 24 | 3.6 |
| 24 | 87 | 3 | 10 | — | 20 | 24 | 120 | 24 | 0.4 |
| 25 | 90 | 10 | — | — | 20 | 24 | 120 | 24 | 1.3 |
| 26 | 90 | — | 10 | — | 20 | 24 | 120 | 24 | 0 |
| 27 | 42 | 50 | 8 | — | — | — | 100 | 65 | 6.3 |

TABLE 3-continued

| | | Composition (parts by weight) | | | | | | | |
|---|---|---|---|---|---|---|---|---|---|
| | Blast | Activator | | | | Water | | | Aluminate |
| Run No. | Furnace Slag | Cement | Calcium Sulfate | Σ 1000 | Ultra-fine Particle | Reducing Agent | Siliceous Sand | Water | Phase (wt %) |
| 28 | 61 | 30 | 9 | — | — | — | 100 | 65 | 3.8 |

TABLE 4

| | Compressive Strength (kgf/cm$^2$) | | | |
|---|---|---|---|---|
| | 20° C. | | 50° C. 7 days | 180° C. |
| Run No. | 7 days | 28 days | 20° C. After 1 day | 10 atm. 3 hrs. |
| 18 | 846 | 1040 | — | — |
| 19 | 866 | 1083 | 1302 | 1495 |
| 20 | 688 | 955 | — | — |
| 21 | 842 | 1013 | 1210 | 1444 |
| 22 | 886 | 1239 | 1175 | 1313 |
| 23 | 958 | 1148 | 1248 | 1473 |
| 24 | — | — | 766 | 1267 |
| 25 | 546 | 700 | 907 | 1473 |
| 26 | — | — | 1030 | — |
| 27 | 102 | 232 | — | — |
| 28 | 100 | 215 | — | — |

Run Nos. 18 to 26 are examples and Run Nos. 27 and 28 are comparative examples.

EXAMPLE 4

The compositions of Run Nos. 19 and 21 in Example 3 were subjected to tests for measuring the hydrate contractions and the length changes upon dry shrinkage. The dimension stability of each composition was appraised by adding the value of hydrate contraction and the value of length change upon dry shrinkage. The hydrate contraction was measured generally in accordance with the Corps of Engineers Specification for non-shrink grout (CRD-C621-83), and the length change upon dry shrinkage was measured by the contact gauge method at 20° C. and at 50% RH while using a sample aged in water for 7 days. For comparison purpose, a composition containing no ultra-fine particle (Run No. 29) was subjected to similar appraisal. The compositions subjected to tests are shown in Table 5, and the results are shown in Table 6.

TABLE 2

| | Composition (part by weight) | | | | | | |
|---|---|---|---|---|---|---|---|
| Run No. | Blast Furnace Slag | Cement | Calcium Sulfate | Ultra-fine Particle | Water Reducing Agent | Silica | Water |
| 19 | 42 | 50 | 8 | 20 | 2.4 | 120 | 24 |
| 21 | 61 | 30 | 9 | 20 | 2.4 | 120 | 24 |
| 29 | — | 120 | — | — | 2.4 | 120 | 27 |

TABLE 6

| Run No. | Dimensional Stability (Hydrate Contraction + Dry Shrinkage at 20° C., at 50% RH after ageing in water for 168 hours) (Ratio*) |
|---|---|
| 19 | 0.54 |
| 21 | 0.63 |
| 29 | 1.0 |

Note:
Run No. 29 is a Comparative Example.
*Ratios in this Table 6 were calculated while taking the value of Run No. 29 as the standard.

EXAMPLE 5

In view of the description in the report by G. Yamaguchi and S. Takagi, Proc. 5th Int'l Symp. Chem. Cement, Tokyo, 1, 181~225 (1968), $Ca_{105}Mg_2AlO_{36}$-($AlSi_{35}O_{144}$) was prepared by mixing $CaCO_3$, MgO, $Al_2O_3$ and $SiO_2$ and kneading with water to obtain pellets which were dried sufficiently at 105° C. and then burnt at 1550° C. for 5 hours in a platinum crucible in an electric furnace. The burnt pellets were pulverized in an alumina ball mill and pelletized again. Similar burning and pulverization operations were repeated for five times. No free-CaO was found when the sample was subjected to free-CaO detection test through the glycerin-alcohol method. The sample was subjected to the powder X-ray diffractiometry to find that it had peaks agreeing with those of alite recorded in the JCPDS card.

The powders were then pulverized in an alumina ball mill into a powder having a specific surface area (Blaine value) of 3240 cm$^2$/g. A normal Portland cement was subjected to similar test for comparison purpose. Each of the compositions set forth in Table 7 was kneaded and then de-bubbled in a vacuum type Omni-mixer (available from Chiyoda Technical and Industrial Co., Ltd.) over a period of 3 minutes, and the table flow value of the thus kneaded and de-bubbled sample was measured generally in accordance with the JIS R 5201 Method. A 4×4×16 cm test specimen was prepared from the same sample which was subjected to test to learn the compressive strength after the specimen had been aged at 20° C., at 80% RH for one day and at 50° C. in air saturated with water vapor for 3 days. The results are shown in Table 7.

Used Materials:
$CaCO_3$: Reagent grade
MgO: Reagent grade
$Al_2O_3$: Reagent grade
$SiO_2$: Reagent grade Alite (Solid solution of $Ca_3SiO_5$, Aluminate Phase: 0%): Synthesized product
Cement: Normal Portland cement (Aluminate Phase: 18.0%) produced and sold by Sumitomo Cement Co., Ltd.
Ultra-fine Particle: Silica fume (produced and sold by Japan Metals & Chemicals Co., Ltd.) having an average particle size of 0.1 μm.
Water Reducing Agent: A condensation product of β-naphthalenesulfonic acid and formalin, produced and sold by Dai-ichi Kogyo Seiyaku Co., Ltd. under the Trade Name of "Selflow 110P".
Aggregate: Dead burnt alum shale (produced in China) having an average particle size of not more than 1.2 mm.
Water: City Water

TABLE 7

| Run No. | Composition (parts by weight) | | | | | | Aluminate Phase (wt %) | Table Flow (mm) | Compressive Strength (kgf/cm$^2$) |
|---|---|---|---|---|---|---|---|---|---|
| | Alite | Cement | Ultra-fine Particle | Water Reducing Agent | Aggregate | Water | | | |
| 30 | — | 90 | 10 | 2 | 100 | 19 | 18.0 | 203 | 1720 |
| 31 | — | 80 | 20 | 2 | 100 | 11.5 | 18.0 | Impossible to pour | — |
| 32 | 90 | — | 10 | 2 | 100 | 19 | 0 | >300 | 1735 |
| 33 | 80 | — | 20 | 2 | 100 | 19 | 0 | >300 | 1760 |
| 34 | 80 | — | 20 | 2 | 100 | 17 | 0 | 260 | 1876 |
| 35 | 80 | — | 20 | 2 | 100 | 11.5 | 0 | 175 | 1993 |

Run No. 30 is a comparative example and Run Nos. 31 to 35 are examples.

EXAMPLE 6

An alite was synthesized from a reduced LD converter slag and pulverized to have a Blaine value of 4870 cm$^2$/g. Using the pulverized alite, the compositions as set forth in Table 8 were prepared and tested similarly as in Example 5. The results are shown in Table 8.

Materials Used:
Alite: An alite synthesized from an LD converter slag containing 0 wt% of aluminate phase.
Other Materials: Same as used in Example 5.

Ultra-fine Particle: Silica fume produced and sold by Japan Metals & Chemicals Co., Ltd.
$CaSO_4.2H_2O$: Reagent grade product
$Ca(OH)_2$: Reagent grade product
Water Reducing Agent: A condensation product of β-naphthalenesulfonic acid and formalin, produced and sold by Dai-ichi Kogyo Seiyaku Co., Ltd. under the Trade Name of "Selflow 110P".
Water: City water
Aggregate: An emery having a particle size of from 0.3 to 1.2 mm, produced and sold by Sumitomo Metal Mining Co. Ltd.

TABLE 8

| Run No. | Composition (parts by weight) | | | | | Aluminate Phase (wt %) | Table Flow (mm) | Compressive Strength (kgf/cm$^2$) |
|---|---|---|---|---|---|---|---|---|
| | Alite | Ultra-fine Particle | Water Reducing Agent | Aggregate | Water | | | |
| 36 | 90 | 10 | 2 | 100 | 19 | 0 | >300 | 1883 |
| 37 | 80 | 20 | 2 | 100 | 19 | 0 | >300 | 1890 |
| 38 | 80 | 20 | 2 | 100 | 14 | 0 | 200 | 1955 |
| 39 | 80 | 20 | 2 | 100 | 11.5 | 0 | 183 | 1997 |

TABLE 9

| Run No. | Composition (parts by weight) | | | | | | | Table Flow (mm) | Compressive Strength (kgf/cm$^2$) |
|---|---|---|---|---|---|---|---|---|---|
| | Blast Furnace Slag | $CaSO_4$—$2H_2O$ | Ultra-fine Particle | Aggregate | $Ca(OH)_2$ | Water Reducing Agent | Water | | |
| 40 | 72 | 8 | 20 | 100 | 0.2 | 2 | 17 | 180 | 1073 |
| 41 | 72 | 8 | 20 | 100 | 0.3 | 2 | 17 | 245 | 1130 |
| 42 | 72 | 8 | 20 | 100 | 0.5 | 2 | 17 | 260 | 1127 |
| 43 | 72 | 8 | 20 | 100 | 0.7 | 2 | 17 | 241 | 1133 |
| 44 | 81 | 9 | 10 | 100 | 0.3 | 2 | 17 | 234 | 1140 |
| 45 | 81 | 9 | 10 | 100 | 0.5 | 2 | 17 | 240 | 1125 |
| 46 | 45 | 5 | 50 | 100 | 0 | 0 | 17 | Impossible to mold | — |

Run No. 46 is comparative example and Run Nos. 40 to 45 are examples.

EXAMPLE 7

A blast furnace slag was prepared by pulverizing a granulated blast furnace slag available as a by-product from an iron works. Using the pulverized blast furnace slag, the compositions as set forth in Table 9 were prepared and tested similarly as in Example 5. In addition, a 4×4×16 cm test specimen of each composition was prepared, aged at 20° C. at 80% RH for one day followed by ageing at 50° C. in air saturated with water vapor for 7 days, and subjected to test to learn the compressive strength of the hardened and aged mass. The results are shown collectively in Table 9.

Materials Used:
Blast Furnace Slag: A quenched (granulated) blast furnace slag having a Blaine value of 4200 cm$^2$/g and containing 0 wt% of aluminate phase.

EXAMPLE 8

Using a fly ash obtained as a by-product from a thermal-power station where coal is burnt as the heat source, the compositions as set forth in Table 10 were prepared and tested similarly as in Example 5.
The results are shown in Table 10.
Materials Used:
Fly Ash: A fly ash produced in Isogo Thermal-power Station of Electric Power Development Co., and having a specific surface area (Blaine Value) of 3010 cm$^2$/g.
Ultra-fine Particle: Silica fume produced and sold by Japan Metals & Chemicals Co., Ltd.
Aggregate: An emery having a particle size of from 0.3 to 1.2 mm, produced and sold by Sumitomo Metal Mining Co. Ltd.

Water Reducing Agent: A condensation product of β-naphthalenesulfonic acid and formalin, produced and sold by Dai-ichi Kogyo Seiyaku Co., Ltd. under the Trade Name of "Selflow 110P".
Water: City water
Ca(OH)$_2$: Reagent grade product.
CaO: A de-carbonized product prepared by burning CaCO$_3$ at 1000° C. to be de-carbonized.
Cement: A normal Portland cement produced and sold by Sumitomo Cement Co., Ltd., and containing 17.8 wt% of aluminate phase.

TABLE 10

| Run No. | Composition (parts by weight) | | | | | | | | Aluminate Phase (wt %) | Table Flow (mm) |
|---|---|---|---|---|---|---|---|---|---|---|
| | Fly Ash | Ultra-fine Particle | Aggregate | Water Reducing Agent | Water | Ca(OH)$_2$ | CaO | Cement | | |
| 47 | 50 | 50 | 100 | 0 | 16 | — | — | — | 0 | Impossible to knead |
| 48 | 80 | 20 | 100 | 2 | 16 | 0.1 | — | — | 0 | 159 |
| 49 | 80 | 20 | 100 | 2 | 16 | 0.2 | — | — | 0 | 216 |
| 50 | 80 | 20 | 100 | 2 | 16 | 0.5 | — | — | 0 | 207 |
| 51 | 80 | 20 | 100 | 2 | 16 | 0.7 | — | — | 0 | 182 |
| 52 | 90 | 10 | 100 | 2 | 16 | 0.2 | — | — | 0 | 213 |
| 53 | 90 | 10 | 100 | 2 | 16 | — | 0.2 | — | 0 | 207 |
| 54 | 90 | 10 | 100 | 2 | 16 | — | — | 0.2 | 0.04 | 205 |
| 55 | 80 | 20 | 100 | 2 | 16 | — | — | 0.2 | 0.04 | 208 |

Run No. 47 is comparative example and Run Nos. 48 to 55 are examples.

EXAMPLE 9

A commercially available blast furnace slag powder, fly ash and opalic silica were used in this Example. The opalic silica was pulverized further in a ball mill to have a specific surface area (Blaine value) of 3200 cm$^2$/g and then dried at 105° C., and the other materials were used directly in the commercially available forms without any further processing.

For pulverization of the particles, used was a pulverizer referred to as IDS-2 Model comprising the Super-sonic Jet Mill Model I (produced and sold by Nippon Pneumatic Mfg. Co. Ltd.) wherein particles were impinged upon a impinging plate while being carried by a super-sonic air flow, and a classification separator (DS-UN, produced and sold by Nippon Pneumatic Mfg. Co. Ltd.) combined together cooperatively. For the comparison purpose, another type super-sonic jet mill (PJM-100, produced and sold by Nippon Pneumatic Mfg. Co. Ltd.) was used to pulverize the particles. The particle size distribution of each of the pulverized particles was measured by the laser surface scattering method (micro-track), and the average particle size was represented by the d$_{50}$ corresponding to the 50% value by weight. Particle size was measured at some intervals during the pulverization operation, and the pulverization operation was continued until the particle size reached the aimed for value. The results are shown in Table 11.

TABLE 11

| No. of Ultra-fine Particle | Sample Material | Used Pulverizer | Average Particle Size (μ) |
|---|---|---|---|
| 1 | Fly Ash | PJM-100 | 10.09 |
| 2 | Opalic Silica | PJM-100 | 9.92 |
| 3 | Fly Ash | IDS-2 Model | 3.04 |
| 4 | Blast Furnace Slag | IDS-2 Model | 2.55 |
| 5 | Opalic Silica | IDS-2 Model | 2.65 |
| 6 | Opalic Silica | IDS-2 Model | 0.83 |
| 7 | Fly Ash | IDS-2 Model | 0.95 |

Material Used:
Fly Ash: A fly ash produced in Isogo Thermal-power Station of Electric Power Development Co.
Opalic Silica: Produced in Iwo-jima, Kagoshima-ken
Blast Furnace Slag: A product available from Nagoya Esment Co., Ltd. under the Trade Name of "Esment".

Using the ultra-fine particles as set forth in Table 11, compositions were prepared while mixing them with other ingredients in the ratio as set forth in Table 12, and each of the compositions was kneaded in a vacuum type Omni-mixer. The table flow value of each composition was measured, and the compressive strength of a 4×4×16 cm specimen, after ageing for 28 days, was measured. During the tests, it was found that the compositions containing the ultra-fine particle Nos. 3 to 7 were uniform mixtures having satisfactory fluidities, and that the compositions containing the ultra-fine particle Nos. 1 and 2 were not uniform and inferior in fluidity. The results are shown collectively in Table 13.

TABLE 12

| Mixing Ratio (part by weight) | | | | | Aluminate Phase (wt %) |
|---|---|---|---|---|---|
| Water | Cement | Ultra-fine Particle | Aggregate | Water-Reducing Agent | |
| 24 | 80 | 20 | 120 | 20 | 12.5 |

Material Used:
Cement: A white Portland cement produced and sold by Chichibu Cement Co., Ltd., and containing 12.5 wt% of aluminate phase.
Aggregate: No. 5 silica having a Moh's hardness of 7.5
Water Reducing Agent: A condensation product of β-naphthalenesulfonic acid and formalin, produced and sold by Dai-ichi Kogyo Seiyaku Co., Ltd. under the Trade Name of "Selflow 110P".

TABLE 13

| Run No. | No. of Ultra-fine Particle | Table Flow Value (mm) | Compressive Strength (kgf/cm$^2$) |
|---|---|---|---|
| 56 | 1 | Uniform Molded Mass not formed. | |
| 57 | 2 | Uniform Molded Mass not formed. | |
| 58 | 3 | 242 | 1,325 |
| 59 | 4 | 220 | 1,370 |
| 60 | 5 | 225 | 1,384 |
| 61 | 6 | 235 | 1,403 |

EXAMPLE 10

The same compositions as described in Example 9 were kneaded in a vacuum type Omni-mixer, and then each of the compositions was filled in a 10φ×20 cm cylinder, with the upper cavity of the cylinder being charged with a silicone oil layer. The hydrate contraction with the lapse of time was measured by measuring the change in height of the surface of the silicone oil layer using a micrometer. The percentage hydrate contraction after the lapse of one day was calculated, while the standard initial column height of the filled composition was set to 10 cm. On the other hand, a 4×4×16 cm test specimen of each composition was prepared and aged at 50° C. for 24 hours while being sealed in a polyvinyl chloride pouch and then further aged at 180° C. for 3 hours in an autoclave. Using the thus aged test specimen, the compressive strength of each composition was measured. During the operation of measuring the compressive strength, the temperature was raised at a rate of 60° C./hr. The results are shown in Table 14.

TABLE 14

| Run No. | Ultra-fine Particle | Hydrate Contraction (%) | Compressive Strength (kgf/cm$^2$) |
|---|---|---|---|
| 62 | No. 3 | 1.4 | 1,687 |
| 63 | No. 4 | 1.2 | 1,668 |
| 64 | No. 5 | 1.1 | 1,674 |
| 65 | No. 6 | 1.2 | 1,694 |
| 66 | No. 7 | 1.6 | 1,642 |

EXAMPLE 11

Adopting the similar test method as used in Example 10, the silica fume was combined with the ultra-fine particles as set forth in Table 11 to prepare blended ultra-fine particles.

The compositions and results are shown in Table 15.

TABLE 15

| Run No. | Ultra-fine Particle (part by weight) | | | Hydrate Contraction (%) | Compressive Strength (kgf/cm$^2$) |
|---|---|---|---|---|---|
| | Silica Fume | Ultra-fine Particle No. 3 | Ultra-fine Particle No. 4 | | |
| 67 | 75 | 25 | — | 1.4 | 1,704 |
| 68 | 50 | 50 | — | 1.5 | 1,690 |
| 69 | 20 | 80 | — | 1.1 | 1,672 |
| 70 | 50 | — | 50 | 1.3 | 1,712 |
| 71 | 75 | — | 25 | 1.8 | 1,687 |

EXAMPLE 12

The ultra-fine particle No. 3 as set forth in Table 11 was used and mixed with other ingredients to prepare the compositions as set forth in Table 16. The compositions were kneaded in a vacuum type Omni-mixer, and a 4×4×16 cm specimen was prepared from each composition. After ageing for 28 days, the compressive strength of each test specimen was measured. Also, the hydrate contraction of each composition was measured, in accordance with a method similar to that described in Example 10, by filling a sample mortar in a 10φ×20 cm cylinder and then measuring the hydrate contraction rate using a micrometer. The results are shown in Table 16.

TABLE 16

| Run No. | Composition (parts by weight) | | | | | Aluminate Phase (wt %) | Compressive Strength (kgf/cm$^2$) | Hydrate Contraction (%) |
|---|---|---|---|---|---|---|---|---|
| | Water | Cement | Ultra-fine Particle No. 3 | Aggregate | Water Reducing Agent | | | |
| 72 | 21 | 95 | 5 | 120 | 2 | 12.5 | 823 | 1.4 |
| 73 | 21 | 80 | 20 | 120 | 2 | 12.5 | 1423 | 1.4 |
| 74 | 21 | 60 | 40 | 120 | 2 | 12.5 | 1317 | 1.6 |

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A hydraulic material composition comprising a hydraulic material having a particle size of 10–30 μm, ultra-fine particles, a water reducing agent and water, said hydraulic material being selected from the group consisting of mineral materials, combinations of activators and materials having hydraulic activities other than cements and mixtures thereof and containing no aluminate phase consisting essentially of $3CaO.Al_2O_3$ and $4CaO.Al_2O_3.Fe_2O_3$, said mineral materials being selected from the group consisting of mineral materials of $Ca_3SiO_5$, solid solutions of $Ca_3SiO_5$ and mixtures thereof, said material having hydraulic activity being blast furnace slag, said activator being selected from the group consisting of cements, calcium hydroxide, calcium oxide, quick lime, calcium sulfoaluminate minerals, inorganic and organic alkaline salts and mixtures thereof, said ultra-fine particles being selected from the group consisting of siliceous dust, calcium carbonate, silica gel, opalic silica, fly ash, blast furnace slag, titanium oxide, aluminum oxide, mineral materials of $Ca_3SiO_5$, solid solutions of $Ca_3SiO_5$ and mixtures thereof, each of said ultra-fine particles having an average particle size of not more than 3 μm, said hydraulic material composition comprising 60 to 95 parts by weight of said hydraulic material and 5 to 40 parts by weight of said ultra-fine particles, not more than 10 parts by weight of said water reducing agent being contained in 100 parts by weight of said hydraulic material, 100 parts by weight of said hydraulic material and said ultra-fine particles being admixed with 10 to 30 parts by weight of water, 100 parts by weight of said material having hydraulic activity being mixed with not more than 100 parts by weight of said activator.

2. The hydraulic material composition according to claim 1, wherein said activator is selected from the group consisting of calcium hydroxide, calcium oxide, quick lime, cements, and mixtures thereof.

3. The hydraulic material composition according to claim 2, wherein said activator is mixed in a ratio such that not more than 1 part by weight of activator is contained in 100 parts by weight of the sum of said hydraulic material and said ultra-fine particle.

4. The hydraulic material composition according to claim 1, wherein said ultra-fine particle is selected from the group consisting of opalic silica, fly ash, blast furnace slag and mixtures thereof.

5. The hydraulic material composition according to claim 1, wherein the average particle size of said ultra-fine particle is not more than 1 μm.

6. The hydraulic material composition according to claim 1, wherein said water reducing agent contains a main ingredient selected from the group consisting of salts of condensation product of naphthalenesulfonic acid and formaldehyde, salts of condensation product of alkylnaphthalenesulfonic acid and formaldehyde, salts of condensation product of melaminesulfonic acid and formaldehyde, high molecular weight ligninsulfonate, polycarboxylates and mixtures thereof.

7. The hydraulic material composition according to claim 6, wherein said water reducing agent is selected from the group consisting of salts of condensation product of naphthalenesulfonic acid and formaldehyde, salts of condensation product of alkylnaphthalenesulfonic acid and formaldehyde, and mixtures thereof.

8. The hydraulic material composition according to claim 1, wherein 100 parts by weight of a mixture of said hydraulic material and said ultra-fine particle is admixed with 12 to 25 parts by weight of water.

9. The hydraulic material composition according to claim 1, further comprising an aggregate.

10. The hydraulic material composition according to claim 9, wherein said aggregate has a Moh's hardness of not less than 6.

11. The hydraulic material composition according to claim 9, wherein said aggregate has a Knoop indentor hardness of not less than 700 kg/mm$^2$.

12. The hydraulic material composition according to claim 10, wherein the ratio of the weight of said aggregate to the total weight of said hydraulic material and said ultra-fine particles is not greater than five.

13. The hydraulic material composition according to claim 1, further comprising a reinforcing material selected from the group consisting of natural and synthetic mineral fibers and natural and synthetic organic fibers.

14. The hydraulic material composition according to claim 1, wherein the compressive strength of the solidified mass after hardening said hydraulic material composition is not less than 1000 kgf/cm$^2$.

* * * * *